United States Patent Office 3,012,995
Patented Dec. 12, 1961

3,012,995
PRODUCT OF A DIENE POLYMER AND A HALOGEN-CONTAINING THIOKETONE
William J. Middleton, Claymont, Del., assignor to E. I. du Pont de Nemours and Company, Wilmington, Del., a corporation of Delaware
No Drawing. Filed Nov. 2, 1959, Ser. No. 850,092
17 Claims. (Cl. 260—79)

This invention relates to polymeric materials and more particularly to essentially linear polymers of diene monomers having a plurality of $\alpha$-hydro-$\beta$-fluoroalkylthio groups attached to chain carbon.

Polymers of dienes, such as butadiene, chloroprene, and isoprene, have great commercial importance. These polymers, including copolymers with up to about 75% or more of units of monoethylenically unsaturated monomers, contain isolated, i.e., non-conjugated, ethylenic groups. The latter are useful and important in that they provide a place for curing or crosslinking reactions necessary for most rubbery products.

Fluorine-containing monomers and polymers have achieved considerable commercial importance in the last few years in view of the inertness and superior properties provided by such products. Considerable effort has been made to provide fluorine-containing polymeric products and examples of such have heretofore been obtained by polymerization of fluorine-containing monomers.

There has now been obtained a new class of fluorine and sulfur-containing polymers, namely, polymers of polymerizable dienes having a substantial number of $\alpha$-hydro-$\beta$-fluoroalkyl sulfide radicals attached to polymer carbons. The new compositions are obtained by reaction with a polymer containing ethylenic unsaturation, e.g., a diene polymer which has a substantial number of ethylenic double bonds in the polymer chain, with a thioketone which has at least four fluorines attached to carbons alpha to the thioketo group.

The following examples further illustrate the products and the reaction.

*Example I*

A solution of 10 g. of pale crepe rubber in one liter of toluene was cooled to 0° C., and hexafluorothioacetone was added dropwise with vigorous stirring until a pale blue color persisted. The precipitate was collected on a filter and dried in a vacuum oven. There was obtained 40 g. of a hexafluorothioacetone modified rubber possessing a fluorine content of 43.07%.

*Example II*

Rubber (7.2 g.) was softened by milling 15 minutes at 80° C. on a rubber mill and was then treated with 3.6 g. of an unstable perfluorothioacetone polymer. On adding the latter polymer, there formed some blue liquid perfluorothioacetone monomer. There was recovered 7.73 g. of product representing a reaction product of rubber with one seventh of the perfluorothioacetone polymer added. This product still reacted with bromine and could be cured by reaction with sulfur dichloride.

*Example III*

Polybutadiene (50 ml. of 5% in xylene) was placed in a glass tube and cooled with ice water. While stirred mechanically, perfluorothioacetone monomer was added until a definite blue color persisted for at least one minute. After reaction, the xylene solvent was evaporated under vacuum, and the residue was 10.5 g. of viscous gum corresponding to a 1:1 addition. The product was only partially soluble in toluene but readily soluble in fluorinated solvents. A film formed on glass showed a high contact angle with water and showed no spotting on contact with lubricating oil or gasoline.

*Example IV*

A 5% toluene solution of neoprene (polychloroprene) was treated with perfluorothioacetone monomer (blue) until the solution showed a blue color for at least one minute. On disappearance of the blue color, a yellow color formed which also slowly disappeared after several minutes. No precipitate was obtained, although the solution was hazy in appearance. This solution was cast on glass to give, after evaporation of solvent, a clear film of perfluorothioacetone-modified neoprene. This film showed a high resistance to water spotting. The film also was resistant to oil but softened on contact with gasoline.

*Example V*

A film of rubber was formed on a piece of steel sheet by dip-coating using a toluene solution of rubber. After three hours and while the rubber film was still very tacky to the touch, it was treated with vapors of perfluorothioacetone monomer. After standing one hour, film was found to be tack-free, whereas a control film of rubber was still extremely tacky. The treated film was water repellent and resistant to lubricating oils. In another experiment, a film of rubber formed by use of rubber latex was treated in similar manner with perfluorothioacetone monomer vapors. Results of this treatment were similar to those obtained above.

The new products of this invention are polymeric but their chain lengths are of the same order as the starting elastomeric materials. They are not as readily cross-linked or cured as the untreated polymer, particularly when an excess of the fluorothioketone is employed in the reaction, although they contain ethylenic unsaturation. The products can be characterized as essentially linear polymers having a plurality of $\alpha$-hydro-$\beta$-fluoroalkylthio groups attached to saturated chain carbon, e.g., having the radical

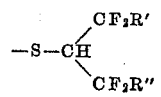

wherein R' and R'' are halogen, hydrocarbon or halogenated hydrocarbon radical of up to six carbons.

The new products are obtained by reaction of a fluorinated thioketone containing difluoromethylene radicals directly attached to the thiocarbonyl carbon with the elastomeric material, i.e., diene polymer or copolymer. The thioketones have the

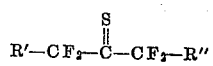

unit and include those wherein the R' and R'' are halogen, hydrocarbon, or halohydrocarbon of up to six carbons, e.g., perfluorohexane-2-thione, perfluorononane-2-thione, perfluorobutanethione, and perfluoroacetone. One method for the preparation of these polyfluorothioketones consists in reacting a secondary polyfluoroalkyl iodide (i.e., of at least three carbon atoms) with hot liquid or vapor of a phosphorus polysulfide, e.g., $P_2S_5$ or $P_4S_3$, as illustrated by the equation

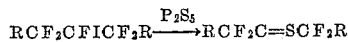

wherein the R groups are hydrogen, halogen, alkyl, and haloalkyl. Preferably, the polyfluoroalkyl iodide is introduced in vapor form into the refluxing phosphorus polysulfide and the volatile polyfluorothioketone which is formed is collected in a receiver cooled below the boiling point of the polyfluorothioketone, e.g., in a trap cooled by a mixture of solid carbon dioxide and acetone. The polyfluorothioketone isolated in the cold receiver can be purified if desired by fractional distillation, usually under reduced pressure.

The reaction is conveniently carried out at atmospheric pressure at the temperature of the refluxing phosphorus sulfide, e.g., at 525° C. when $P_2S_5$ is being used. The reaction between the polyfluoroalkyl iodide and the molten phosphorus sulfide takes place rapidly and the polyfluorothioketone reaction product is removed from the reaction zone as it is formed. Best yields of the polyfluorothioketones are obtained when the vapor of the polyfluoroalkyl iodide is introduced at a fairly rapid rate into the molten phosphorus sulfide.

The secondary polyfluoroalkyl iodides used in the process can be made by known methods. For example, they can be made by the free radical addition of the appropriate fluoroalkyl iodide to a fluoroolefin. This and other methods for preparing fluoroalkyl iodides are described in "Aliphatic Fluorine Compounds" by Lovelace, Rausch, and Postelnek, Reinhold Publishing Corp., New York, 1958, pages 37-40.

The elastomeric products or rubbers that are reacted with the α-fluoroalkyl thiocarbonyl compounds to give improved products have a plurality of ethylenic unsaturations. Included are synthetic and natural polymers of isoprene, as well as polymers and copolymers of butadiene and chlorobutadiene. The copolymers should have a substantial amount of recurring units derived from the diene, e.g., at least 10% of the copolymer, and generally 60% or more. The monoethylenically unsaturated monomers conventionally used to prepare rubbers with dienes include monomeric acrylonitrile and styrene.

The polymers employed in the process of this invention have a molecular weight generally in excess of 1000 and preferably 2000 or higher. The polymers are preferably soluble in or swollen by relatively inert solvents to enable rapid reaction of the plurality of isolated ethylenic double bonds with the thiocarbonyl compounds. The rubbery polymeric material employed should have a ratio of generally at least one ethylenic double bond to about 20 chain carbons.

The reaction between the elastomer derived from diene units and the α-fluorinated thioketone preferably takes place in liquid phase as obtained by solution of the elastomeric material in an inert solvent, such as hydrocarbon or chlorinated hydrocarbon. In some instances, substantial reaction takes place when the elastomer is in a swollen state or on a rubber mill.

No special requirements are made as to temperature, time, catalysts, etc., for the reaction. Mixing of the reactants under liquid phase reaction conditions is usually all that is necessary. The completion of the reaction is readily observed by discharge of the thioketone color. Generally the latter is added until no more reacts and the reaction is then judged to be complete.

In general, the new products have fluorine present in substantial amounts, e.g., 5% or more. They also have sulfide groups. The new products have properties considerably different from the original elastomer. The new products are generally soluble in selected inert solvents and solutions can be applied to metal, wood, fabric, and paper to produce coatings. Coatings on paper are especially attractive and show excellent water-repellent and good oil-repellent properties. Similar coatings on steel show lubricating properties as indicated by a low coefficient of static friction. These coatings also have improved corrosion resistance.

Since obvious modifications and equivalents in the invention will be evident to those skilled in the chemical arts, I propose to be bound solely by the appended claims.

The embodiments of the invention in which an exclusive property or privilege is claimed are defined as follows:

1. The reaction product of a linear diene polymer having ethylenic double bonds in the polymer chain and perfluorothioacetone, said reaction product containing at least about 5% by weight of fluorine.

2. The reaction product of natural rubber and perfluorothioacetone, said reaction product containing at least about 5% by weight of fluorine.

3. The reaction product of polyisoprene and perfluorothioacetone, said reaction product containing at least about 5% by weight of fluorine.

4. The reaction product of polybutadiene and perfluorothioacetone, said reaction product containing at least about 5% by weight of fluorine.

5. The reaction product of polychloroprene and perfluorothioacetone, said reaction product containing at least about 5% by weight of fluorine.

6. The process which comprises reacting a diene polymer having a plurality of ethylenic double bonds in the polymer chain and a thioketone which has at least four fluorines attached to carbons alpha to the thioketo group and thereby forming a reaction product containing at least about 5% by weight of fluorine.

7. The process which comprises reacting a diene polymer having a plurality of ethylenic double bonds in the polymer chain and perfluorothioacetone and thereby forming a reaction product containing at least about 5% by weight of fluorine.

8. The process which comprises reacting natural rubber and perfluorothioacetone and thereby forming a reaction product containing at least about 5% by weight of fluorine.

9. The process which comprises reacting polyisoprene and perfluorothioacetone and thereby forming a reaction product containing at least about 5% by weight of fluorine.

10. The process which comprises reacting polybutadiene and perfluorothioacetone and thereby forming a reaction product containing at least about 5% by weight of fluorine.

11. The process which comprises reacting polychloroprene and perfluorothioacetone and thereby forming a reaction product containing at least about 5% by weight of fluorine.

12. The reaction product of an ethylenically unsaturated linear diene polymer and a thioketone of the formula

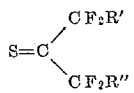

R′ and R″ being selected from the group consisting of halogen and hydrocarbon and halogenated hydrocarbon of up to 6 carbons, fluorine comprising at least about 5% by weight of said reaction product.

13. The reaction product of (1) a linear diene polymer having a molecular weight of at least 1000 and at least one ethylenic bond to about 20 chain carbons and (2) a thioketone of the formula

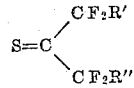

R′ and R″ being selected from the group consisting of halogen and hydrocarbon and halogenated hydrocarbon of up to 6 carbons, said reaction product containing at least about 5% by weight of fluorine.

14. The reaction product of (1) a linear diene polymer having a molecular weight of at least 1000 and at least one ethylenic bond to about 20 chain carbons and (2) perfluorothioacetone, said reaction product containing at least about 5% by weight of fluorine.

15. The reaction product of (1) polyisoprene having a molecular weight of at least 1000 and (2) perfluorothioacetone, said reaction product containing at least about 5% by weight of fluorine.

16. The reaction product of (1) polybutadiene having a molecular weight of at least 1000 and (2) perfluorothioacetone, said reaction product containing at least about 5% by weight of fluorine.

17. The reaction product of (1) polychloroprene having a molecular weight of at least 1000 and (2) perfluorothioacetone, said reaction product containing at least about 5% by weight of fluorine.

References Cited in the file of this patent

Chemical Abstracts, vol. 48 (1954), 2404.
Journal of the Chemical Society (1955), pp. 3871–3880.

UNITED STATES PATENT OFFICE
CERTIFICATE OF CORRECTION

Patent No. 3,012,995 December 12, 1961

William J. Middleton

It is hereby certified that error appears in the above numbered patent requiring correction and that the said Letters Patent should read as corrected below.

Column 2, line 64, for "perfluoroacetone" read -- perfluorothioacetone --.

Signed and sealed this 23rd day of October 1962.

(SEAL)
Attest:

ERNEST W. SWIDER
Attesting Officer

DAVID L. LADD
Commissioner of Patent: